United States Patent
Fusamae et al.

(10) Patent No.: US 7,132,471 B2
(45) Date of Patent: Nov. 7, 2006

(54) RUBBER COMPOSITION AND PROCESS FOR PRODUCTION THEREOF

(75) Inventors: Hiroshi Fusamae, Tokyo (JP); Haruo Yamada, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/512,283

(22) PCT Filed: Apr. 24, 2003

(86) PCT No.: PCT/JP03/05286

§ 371 (c)(1),
(2), (4) Date: Oct. 22, 2004

(87) PCT Pub. No.: WO03/091327

PCT Pub. Date: Jun. 11, 2003

(65) Prior Publication Data

US 2005/0165153 A1  Jul. 28, 2005

(30) Foreign Application Priority Data

Apr. 25, 2002 (JP) .............................. 2002-124169
Dec. 3, 2002 (JP) .............................. 2002-350983

(51) Int. Cl.
- C08K 3/04 (2006.01)
- C08K 5/24 (2006.01)
- C08L 23/04 (2006.01)
- C08F 255/02 (2006.01)
- C09B 67/00 (2006.01)

(52) U.S. Cl. ................. 524/502; 524/424; 524/492; 524/262; 525/88; 525/342

(58) Field of Classification Search ............... 525/88; 524/424, 502

See application file for complete search history.

(56) References Cited

U.S. PATENT DOCUMENTS 3,014,883 A * 12/1961 Wolf .......................... 524/432
6,369,167 B1 * 4/2002 Morita et al. ............... 525/342
2004/0030017 A1 * 2/2004 Simonot et al. ............. 524/424
2004/0077787 A1 * 4/2004 Karande et al. .............. 525/88

FOREIGN PATENT DOCUMENTS

| DE | 43 08 311 A1 | 9/1994 |
|---|---|---|
| JP | 62-137002 | 6/1987 |
| JP | 03-258841 | 11/1991 |
| JP | 11-263878 | 9/1999 |
| JP | 11-286575 | 10/1999 |
| JP | 2000-236905 | 9/2000 |
| JP | 2001-161404 | 6/2001 |
| WO | WO 99/31178 | 6/1999 |
| WO | WO 01/96462 A2 | 12/2001 |

OTHER PUBLICATIONS

Harley's Condensed Chemical Dictionary, 11th Ed, p. 1038.*

* cited by examiner

*Primary Examiner*—David W. Wu
*Assistant Examiner*—Ives Wu
(74) *Attorney, Agent, or Firm*—Finnegan, Henderson, Farabow, Garrett & Dunner, L.L.P.

(57) ABSTRACT

The present invention provides rubber compositions having an excellent transparency and rubber properties comprising a rubbery polymer and an inorganic filler, and relates to specific methods of producing said rubber. Thus, they are rubber compositions comprising 100 parts by weight of at least one rubbery polymer and 5–150 parts by weight of an inorganic filler per 100 parts by weight of said rubbery polymer, wherein the haze is 50% or less, and the inorganic bulking agents are dispersed so that the number of circular regions with a diameter of 0.5 μm or greater having no inorganic fillers is one or less and the number of circular regions with a diameter of 0.3 μm or greater having no inorganic fillers is three or less in an image of a 5 μm square of said rubber composition determined by a scanning probe microscope (SPM) and wherein the haze of said rubber composition having a thickness of 5 mm is 50% or less, and specific methods of producing them.

11 Claims, 2 Drawing Sheets

RUBBER COMPOSITION AND PROCESS FOR PRODUCTION THEREOF

TECHNICAL FIELD

The present invention relates to rubber compositions having an excellent transparency, excellent rubber properties, specifically compression-set (c-set) resistance and abrasion resistance, or a high hardness and an excellent transparency, methods of producing them, and footwear comprising said rubber compositions.

BACKGROUND ART

In various applications that require transparency and coloring, thermoplastic elastic rubber compositions in which an inorganic filler has been blended in a thermoplastic elastic body have conventionally been reported. For example, there are rubber compositions comprising a thermoplastic elastic body and silica, rubber compositions comprising a thermoplastic elastic body and titanium oxide, and the like.

Also, usually in the blending of vulcanized rubbers, when a closed-type mixer for example a Banbury mixer or an internal mixer is used to add and knead an inorganic filler and the like, temperature rises as soon as rubber mastication is started, and during the process of rising temperature an inorganic filler etc. are added, and it reaches a temperature higher than 60° C. before the passage of 30 seconds at the latest after the start of kneading.

When an open roll etc. is used, kneading has been performed at a high rubber temperature exceeding 60° C. in order to enhance rubber plasticity and facilitate kneading.

JP-A-62-137002 relates to shoe soles having an excellent coloring and abrasion resistance obtained by specifying silica and a silane coupling agent and mixing rubber with a thermoplastic resin, and describes that coloring may be effected without using carbon black.

JP-A-2000-236905 discloses a light-weight abrasion resistant soling material comprising a high cis-polybutadiene, a styrene resin and silica.

JP-A-2001-161404 describes shoe soles in which rubber and silica have been and the gravity thereof has been specified.

Rubber compositions using a thermoplastic elastic body indeed have transparency and coloring to a certain degree, but they have problems of poor c-set and poor abrasion resistance, and poor oil resistance. In rubber compositions for which such transparency and coloring are required, attaining balances between transparency and physical properties such as c-set and abrasion resistance while maintaining sufficient transparency have not been sufficient. On the other hand, in rubber compositions in which oil resistance has been improved by vulcanization of styrene butadiene rubber, there are problems that when the amount of inorganic fillers is reduced in order to enhance transparency and coloring properties, the physical properties of the vulcanized rubber compositions such as c-set and abrasion resistance become decreased, and conversely when the amount of inorganic fillers is increased, these physical properties may be enhanced to a certain degree but transparency and coloring properties become decreased.

It is an object of the present invention to provide transparent rubber compositions having an excellent transparency and coloring properties, and rubber properties such as c-set and abrasion resistance, methods of producing them, and footwear having excellent designing and functional properties using said transparent rubber compositions.

DISCLOSURE OF THE INVENTION

After intensive and extensive study on rubber compositions for which transparency is required in order to solve the above problems, it was found that the above objective can be attained by a specific haze value and a specific dispersion state of the inorganic filler. Thus, it can be attained by providing the following rubber compositions.

Thus, the present invention relates to the following aspects:

(1) A rubber composition comprising 100 parts by weight of a rubbery polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 μm or more having no inorganic fillers is one or less and the number of circular regions with a diameter of 0.3 μm or more having no inorganic fillers is three or less in an image of a 5 μm square of said rubber composition determined by a scanning probe microscope (SPM).

(2) The rubbery composition according to (1) wherein said rubbery polymer comprises 5–80% by weight of the rubbery polymer component (A) having a refractive index of 1.535 or greater and less than 1.600 and 20–95% by weight of the rubbery polymer component (B) having a refractive index of 1.400 or greater and less than 1.530.

(3) The rubber composition according to (2) wherein the difference in refractive index between component (A) and component (B) is 0.010 or greater.

(4) The rubber composition according to (2) or (3) wherein component (A) is a copolymer of a vinyl aromatic compound and a conjugated diene compound in which the amount of the vinyl aromatic compound bound is 26–90% by weight, and component (B) is a diene polymer in which the amount of the vinyl aromatic compound bound is 25% by weight or less, and the haze of said rubber composition having a thickness of 5 mm is 37% or less.

(5) The rubber composition according to any one of (2) to (4) wherein the amount of the vinyl aromatic compound bound in the copolymer of component (A) is greater than that in the polymer of component (B) by 25% by weight or more.

(6) The rubber composition according to any one of (2) to (5) wherein the acetone extract in each of component (A) and component (B) is 2% by weight or less.

(7) The rubber composition according to any one of (2) to (6) wherein component (B) is a polybutadiene in which the amount of 1,4-cis bond is 80% by weight or more.

(8) The rubber composition according to any one of (1) to (7) wherein the inorganic filler is a silica filler having a specific surface area of 100 m²/g or more.

(9) The rubber composition according to any one of (1) to (8) wherein the inorganic filler is a dry silica having a mean primary particle diameter of 30 nm or smaller.

(10) A method of producing a rubber composition comprising 100 parts by weight of a rubber polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 μm or more having no inorganic fillers is one or less and the number of circular regions with a diameter of 0.3 μm or more having no inorganic fillers is three or less in an image of a 5 μm square of said rubbery composition determined by a scanning probe microscope (SPM), said method comprising kneading said rubbery polymer and said inorganic filler for at least 30 seconds or longer per run of kneading at a rubber temperature of 0–60° C.

(11) The method of producing a rubber composition according to (10) wherein the rubber composition comprises 5–80% by weight of the rubbery polymer component (A) having a refractive index of 1.535 or greater and less than 1.600 and 20–95% by weight of the rubbery polymer component (B) having a refractive index of 1.400 or greater and less than 1.530, and said rubbery polymer and the inorganic filler are kneaded for at least 30 seconds or longer per run of kneading at a rubbery temperature of 10–50° C.

(12) A footwear having excellent designing and functional properties using the rubber composition according to any one of (1) to (9).

BEST MODE FOR CARRYING OUT THE INVENTION

The present invention relates to a rubber composition comprising 100 parts by weight of a rubbery polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 µm or more having no inorganic fillers is one or less and the number of circular regions with a diameter of 0.3 µm or more having no inorganic fillers is three or less in an image of a 5 µm square of said rubber composition determined by a scanning probe microscope (SPM).

In the rubber composition of the present invention, as the rubbery polymer there can be used, for example, diene polymers, olefin polymers, urethane polymers, and the like. Preferred rubbery polymers are diene polymers and olefin polymers.

Diene polymers are, for example, at least one conjugated diene compound, or a copolymer of said conjugated diene compound and at least one other copolymerizable monomer.

As conjugated diene compounds, there can be used, for example, 1,3-butadiene, isoprene, 2,3-dimethyl-1,3-butadiene and the like, and as other copolymerizable monomers, there can be used, for example, styrene, α-methyl styrene, p-methyl styrene, divinylbenzene, 1,1-diphenyl ethylene, acrylonitrile, acrylic esters, methacrylic esters and the like, with vinyl aromatic compounds being preferred.

As diene polymers, there can be used, for example, butadiene rubber (BR), isoprene rubber (IR), styrene-butadiene rubber (SBR), styrene-isoprene-butadiene rubber (SIBR), nitrile-butadiene rubber (NBR), further high purity natural rubber and the like. Furthermore, the modified polymers, branched polymers such as coupling, or hydrogenated compounds thereof can also be used. Monomer units in the copolymers may be randomly distributed or may be distributed in blocks.

Olefin polymers may be obtained by polymerizing olefins, and encompass all of the rubbery polymers. For example, buthyl rubber (IIR), ethylene-propylene rubber (EPM·EPDM), ethylene alpha olefin copolymers, ethylene styrene copolymers, and the like. Furthermore, ethylene-conjugated diene copolymers may also be included.

Urethane polymers are, for example, urethane rubber (TPU).

The rubbery polymers for use in the present invention may be a linear or branched structure.

Also, modified rubbery polymers in which the ends have been modified by modifying agents are a preferred raw material rubber, and modifying agents include, for example, metal compounds such as tin compounds, hydroxy group-containing compounds, carboxyl group-containing compounds, amine derivatives, amides, imines, silane compounds, epoxy compounds and the like, and specifically there can be preferably used modifying agents containing modifying groups having high affinity for silica such as hydroxy group-containing compounds, amine derivatives, amides, imines, silane compounds, and epoxy compounds. Two or more of such modifying agents may be used in combination, or other modifying agents may also be used.

Furthermore, the rubbery polymer of the present invention is composed of polymer component (A) and component (B), preferably having different refractive indexes. Component (A) has a refractive index of 1.535 or greater and less than 1.600, preferably 1.540 or greater and less than 1.600. Enhancement of the refractive index of a polymer may be accomplished by increasing the amount of monomer components having high refractive index such as vinyl aromatic compounds. Examples of vinyl aromatic compounds having high refractive index include styrene, α-methyl styrene, p-methyl styrene, divinylbenzene, 1,1-diphenyl ethylene and the like.

Component (B) is a polymer having a refractive index of 1.400 or greater and less than 1.530. Since the rubbery polymer comprises a polymer of two components having different refractive index, the haze become decreased and thereby a rubber composition having a good transparency can be obtained.

Preferably the difference in refractive index between component (A) and component (B) is 0.010 or greater, and more preferably 0.020 or greater. The greater the difference in refractive index is, the higher the transparency of the rubber composition becomes.

The content of component (A) in the rubbery polymer is 5–80% by weight, preferably 10–75% by weight, and most preferably 15–70% by weight, and component (B) is 20–95% by weight.

When component (A) has a composition of 5–80% by weight, a good transparency can be obtained, and when component (B) has a composition of 20–95% by weight, balance of rubber properties such as abrasion resistance and c-set and transparency becomes favorable.

In the rubber composition of the present invention, a preferred component (A) is a copolymer of a vinyl aromatic compound and a conjugated diene compound. Preferred vinyl aromatic compounds include, for example, styrene, α-methyl styrene, p-methyl styrene, divinylbenzene, and 1,1-diphenyl ethylene, with vinyl styrene most preferred.

As conjugated diene compounds, there can be used, for example, 1,3-butadiene, isoprene, 2,3-dimethyl-1,3-butadiene and the like. 1,3-butadiene and isoprene are preferred.

As other examples of monomers copolymerizable with conjugated diene compounds, there can be mentioned acrylonitrile, acrylic esters, methacrylic esters, and the like.

When component (A) having a refractive index of 1.535 or greater and less than 1.600 of the rubbery polymer of the rubber composition of the present invention is a copolymer comprising a vinyl aromatic compound and a conjugated diene compound, the amount of the vinyl aromatic compound bound in said copolymer is preferably 26–90% by weight. When the amount of the vinyl aromatic compound bound in said component (A) copolymer is 26–90% by weight, the rubber composition obtained has a good transparency, and thus has favorable gripping properties for use in shoe soles and the like. When it is 90% by weight or less, the mixing and processing properties of the rubber composition become excellent and favorable dispersibility of the inorganic filler can be obtained.

Also, the binding structure of the vinyl aromatic compound and the conjugated diene compound in the component (A) copolymer may be a block distribution or a random distribution, and may be selected based on, but not limited to, the purpose of the rubber composition obtained.

When component (B) having a refractive index of 1.400 or greater and less than 1.530 of the rubbery polymer of the rubber composition of the present invention is a diene polymer, the amount of the vinyl aromatic compound bound is preferably 25% by weight or less. Since the amount of the vinyl aromatic compound bound in the diene polymer of component (B) is 25% by weight or smaller, an excellent transparency can be obtained.

The binding structure of the vinyl aromatic compound and of the conjugated diene compound in the diene polymer of component (B) may be, but not limited to, a block distribution or a random distribution.

It is preferred that the amount of the vinyl aromatic compound bound in the rubbery polymer component (A) in the rubber composition of the present invention is greater than in component (B) by 25% by weight or more, in which case rubber compositions having a more excellent transparency can be obtained. The lower the compatibility of component (A) and component (B), the more excellent the transparency of the rubber composition to which an inorganic filler has been added becomes.

Component (A) specifically preferred for use as the rubbery polymer of the rubber composition of the present invention is a styrene-butadiene copolymer in which the amount of the styrene bound is 26–90% by weight, and more preferably the amount of the styrene bound is 30–80% by weight. When the amount of the styrene bound of component (A) is 26–90% by weight, a rubber composition having an excellent balance of transparency and physical properties can be obtained.

As component (A), two or more types of styrene-butadiene copolymers having different amounts of styrene bound can be used. The binding of styrene in the styrene-butadiene copolymer may be, but not limited to, a block distribution or a random distribution. The distribution of the vinyl bound in the butadiene portion may also be a block distribution or a random distribution, but in order to satisfy abrasion resistance, the amount of the vinyl bound is preferably 80% by weight or less, preferably 60% by weight or less, and more preferably 40% by weight or less.

The binding of styrene of the styrene-butadiene copolymer having the amount of styrene bound of 25% by weight or less as a preferred component (B) of the present invention can be, but not limited to, a block distribution or a random distribution. The distribution of the vinyl bound in the butadiene portion may be, but not limited to, a block distribution or a random distribution. But in order to satisfy abrasion resistance, the amount of the vinyl bound is preferably 80% by weight or less, preferably 60% by weight or less, and more preferably 40% by weight or less. In the case of polybutadiene, in order to satisfy abrasion resistance, the amount of the vinyl bound is preferably 80% by weight or less, preferably 60% by weight or less, and more preferably 40% by weight or less.

As component (B) for use in the present invention, high cis-polybutadiene in which 1,4-cis bond is 80% by weight or more is specifically preferred. In that case, abrasion resistance becomes more excellent in addition to transparency.

According to the present invention, those component (A) and component (B) in which the acetone extract is 2% by weight or less are specifically preferred. The components of the acetone extract, which are the residue of emulsifying agents, acids, salts etc. used for emulsion polymerization and the like, persist in rubber leading to an enhanced haze and a reduced transparency of the rubber composition, and is also responsible for coloring. Thus, the preferred rubbery polymers that is used in the present invention are those polymers having very few impurities produced in solution polymerization.

As inorganic fillers of the rubber composition of the present invention, there can be used, for example, silica, zinc flower, zinc carbonate, magnesium carbonate, magnesium hydroxide, calcium carbonate, magnesium carbonate, clay etc., and combinations of two or more of them can be used.

More preferred inorganic fillers are those that have refractive index in the range of 1.450–1.570 from the viewpoint of conferring more favorable transparency, and they include, for example, silica, magnesium carbonate and magnesium hydroxide. A specifically preferred inorganic filler is silica. As silica, there can be used those that are called dry silica, wet silica, synthetic silicate white carbon, colloidal silica, and the like. Also, silica of which surface has been rendered hydrophobic, and mixtures of silica and an inorganic filler other than silica can be used, but most preferred is dry silica having a small particle size with a specific surface area of 100 $m^2/g$ or more. The mean primary particle diameter of dry silica is preferably 50 nm or smaller, more preferably 40 nm or smaller, most preferably 30 nm or smaller. By selecting silica having a small primary particle diameter and then subjecting it to an optimum kneading condition of the present invention, rubber compositions having a more preferred transparency can be obtained. It is preferred that the primary silica particles are smaller, but when the dispersion state is not good, secondary particles remain as they are, and aggregates larger than or as large as the visible light wavelength are present, and conversely regions in which there is no silica present are formed, and the difference of refractive indexes of those regions produce opaque rubber compositions. Since specific inorganic fillers such as silica are in an excellent dispersion state in rubber compositions, the desired transparency can be attained.

According to the rubber composition of the present invention, the amount of inorganic fillers used is 5–150 parts by weight per 100 parts by weight of the raw material rubber, the rubbery polymer, preferably 10–120 parts by weight, and most preferably 10–100 parts by weight. Within this range, there can be obtained rubber compositions having an excellent transparency and an excellent balance with abrasion resistance and c-set.

Thus, the transparent rubber composition of the present invention is a rubber composition, wherein the haze is 50% or less, and the inorganic filler is dispersed so that the number of circular regions with a diameter of 0.5 µm or more having no inorganic fillers is one or less and the number of circular regions with a diameter of 0.3 µm or more having no inorganic fillers is three or less in an image of a 5 µm square of said rubber composition determined by a scanning probe microscope (SPM). More preferable is a rubber composition having a more preferred haze of 37% or less, and an excellent dispersibility that the number of circular regions with a diameter of 0.5 µm or more having no inorganic fillers is zero, the number of circular regions with a diameter of 0.3 µm or more having no inorganic fillers is one or less, and the number of circular regions with a diameter of 0.2 µm having no inorganic fillers is three or less in an image of a 5 µm square of said rubber composition determined by a scanning probe microscope (SPM). By satisfying the haze and dispersibility of inorganic fillers, an excellent transparency and rubber physical properties of various molded products can be obtained.

The transparent rubber composition of the present invention observed by SPM is a rubber composition in which the mean dispersed particle diameter of the inorganic fillers is dispersed to the primary particle level of 50 nm or less, preferably 30 nm or less, and the particles take a homogeneous distribution state in which there are almost no aggregate network of inorganic fillers. Specifically, in rubber compositions having blended therein inorganic filler with a potent aggregating property such as silica, there can be usually observed, when observed by SPM, regions in which very few inorganic fillers are present and regions in which they are densely distributed, but in the transparent rubber compositions of the present invention having an excellent transparency, there are almost no regions in which inorganic fillers are not present, and they take a morphology in which inorganic fillers are evenly dispersed.

It is preferred that the rubbery polymers for use in the present invention are polymers having very few impurities, just as polymers produced by solution polymerization, in order to obtain an excellent transparency and coloring.

The Mooney viscosity of the rubbery polymer of the transparent rubber compositions of the present invention is not specifically limited, and a preferred range of Mooney viscosity (ML1+4 100° C.) is 10–150, and in the case of highly hard polymers it is in the range of 5–120 at the condition of ML5+4 100° C. or MS1+4 100° C. or the like. Any range of Mooney viscosity may be used as long as it allows processing.

A non-contaminating oil can be added to the rubber composition of the present invention as a softening agent. Such an oil may be a naphthene oil or a paraffin oil, and a preferred amount added is 50 parts by weight or less per 100 parts by weight of the raw material rubber.

Also, various additives may be added to the rubber composition of the present invention in order to improve the characteristics.

Additives may include, for example, silane coupling agents that link inorganic fillers to rubber.

Silane coupling agents include, for example, alkoxysilane compounds such as tetraethoxysilane, vinyl trimethoxysilane, vinyltris(2-methoxyethoxy)silane, 3-aminopropyl triethoxysilane, 3-glycidoxypropylmethyl dimethoxysilane, bis-[3-(triethoxysilyl)-propyl]tetrasulfide, bis-[3-(triethoxysilyl)-propyl]disulfide, triethoxysilylpropyl-methacrylate-monosulfide and the like, and most preferably tetraethoxysilane, vinyl trimethoxysilane, and vinyltris(2-methoxyethoxy)silane. The preferred amount of silane coupling agents used according to the present invention is 0–20 parts by weight per 100 parts by weight of raw material rubber, and most preferably 0.5–10 parts by weight, and two types or more may be used in combination. By using silane coupling agents, mechanical strength of the rubber composition such as modulus, tensile strength, tear strength etc. can be increased, and c-set, abrasion resistance etc. are enhanced to provide an excellent balance with transparency.

As additives, dispersing agents and activating agents may be added. For example, fatty acids such as stearic acid, oleic acid, and lauric acid or derivatives thereof, or diethylene glycol, polyethylene glycol etc. may be added at 5 parts by weight or less per 100 parts by weight of the raw material rubber, and those having as low melting point as possible are more preferred. If the amounts of such dispersing agents and activating agents added exceeds 5 parts by weight, turbidity and bleeding of the rubber compositions obtained may occur, which is not desirable.

Furthermore, there can be added various stabilizers such as non-contaminating age resistors, anti-oxidants, antiozonants, and UV absorbers, and pigments depending on uses.

When the rubber compositions of the present invention are cross linked or vulcanized, various crosslinking agents and vulcanizing agents may be used. They are, for example, sulfur, sulfur compounds, organic peroxides, oximes, nitroso compounds, polyamines, metal compounds and the like, and they may be used in combination. Preferred are sulfur, sulfur compounds, and organic peroxides, with organic peroxides being most preferred such as t-butyl hydroperoxide, cumene hydroperoxide, dicumyl peroxide, di-t-butyl peroxide, 2,5-dimethyl-2,5-(t-butylperoxy)hexane, benzoylperoxide, and 1,1-bis(t-butylperoxy)-3,3,5-trimethylcyclohexane. In vulcanization of the sulfur series, use of non-contaminating vulcanization accelerators is preferred.

The method of producing the rubber composition of the present invention is a method of producing rubber compositions comprising 100 parts by weight of at least one rubbery polymer and 5–150 parts by weight of at least one inorganic filler per 100 parts by weight of said rubbery polymer, which comprises kneading said rubbery polymer and said inorganic filler at least once for 30 seconds or longer at a rubber temperature of 0–60° C. during the step of kneading.

Thus, the method of producing the rubber composition of the present invention is a method of producing rubber compositions, which comprises kneading a rubbery polymer and an inorganic filler at a kneading temperature of 0–60° C., preferably 10–50° C., for 30 seconds or longer, preferably one minute or longer, in the step of kneading, and by kneading within this range, the dispersibility of inorganic fillers is enhanced and balance of transparency with physical properties such as abrasion resistance or c-set becomes more excellent.

In such a method of producing rubber compositions according to the present invention, any type of kneading machines may be used. For example, a Banbury mixer, a pressure kneader, an internal mixer, an extruder, an open roll, and the like are cited.

The method of kneading rubber compositions according to the present invention may be a method in which at a temperature range of 0–60° C., all or part of the rubbery polymer and an inorganic filler and, as needed, all or part of other additives may be added and kneaded for 30 seconds or longer, or a method in which kneading is conducted at a given temperature of 60–180° C. due to the heat generated by kneading or the like until a given time.

Alternatively, the method of producing the rubber composition of the present invention may be a method in which, at the first step, blending is effected at a maximum kneading temperature of 60–180° C., and then the rubber composition is kneaded again at 0–60° C. for 30 seconds or longer, and during re-kneading, a vulcanizing agent, a crosslinking agent, or another additive may be added.

Furthermore, it may be a method of producing rubber compositions which comprises adding and kneading rubber and an inorganic filler and, as needed, another additive using a mixing roll etc. at a constant temperature range of 0–60° C., or a method of blending and kneading rubber and an inorganic filler etc. at a high temperature exceeding 60° C. as in the conventional method, and blending them at a conventional kneading temperature, followed by kneading again the rubber composition at 0–60° C. for 30 seconds or longer, said method comprising adding, during re-kneading another additive such as a vulcanizing agent, a crosslinking agent etc.

Though a high temperature exceeding 60° C. is required since the kneading of a highly hard rubber is difficult at low temperature, a highly hard rubber and a less hard kneadable rubber may be blended at a temperature 60° C. or higher and then rubber compositions may be produced according to the production method of the present invention.

Alternatively, methods of producing the rubber compositions of the present invention may be producing rubber compositions which comprises kneading by repeating kneading at a high temperature and kneading at a low temperature such as a method of production comprising kneading simultaneously a material that requires processing at a high temperature, another rubber, and other additives such as an inorganic filler, and a vulcanizing agent at a temperature of 60° C. or higher, and then kneading again at a temperature of 0–60° C. or a method further comprising kneading them again at a temperature of 60° C. or higher, and other methods.

In brief, methods of producing the rubber compositions of the present invention are characterized in that a rubbery polymer and an inorganic filler are kneaded at a temperature range of 0–60° C. for 30 seconds or longer in either of the step of kneading continuously, the initial step of kneading in multi-steps, a midway step, and the final step, and intend to enhance dispersibility of the inorganic filler in the rubber composition in order to enhance transparency and physical properties.

When moisture content etc. is high in the raw material rubber and inorganic fillers for use in the method of producing the rubber composition of the present invention, said moisture may aggravate transparency or weaken the reinforcing effect leading to decreased physical properties. When using raw material rubber or inorganic fillers having such a high moisture content, hopefully they are preferably dried prior to use. It is also possible to conduct kneading simultaneously with removal of moisture by evaporation at the high temperature kneading at 100° C. or more. If there is residual water in the blending, crosslinking and vulcanizing become heterogeneous, turbidity and air bubbles may arise in the vulcanized rubber compositions obtained, and various physical properties become inadequate.

The present invention also relates to a footwear comprising a rubber composition having the haze of the rubber composition 5 mm thick is 50% or less, wherein the number of circular regions with a diameter of 0.5 μm or more having no inorganic fillers is one or less and the number of circular regions with a diameter of 0.3 μm or more having no inorganic fillers is three or less in an image of a 5 μm square determined by a scanning probe microscope (SPM) of a rubber composition comprising 100 parts by weight of at least one rubbery polymer and 5–150 parts by weight of at least one inorganic filler per 100 parts by weight of said rubbery polymer. The rubber compositions of the present invention may be used in any applications making use of transparency, coloring characteristics, abrasion resistance, c-set and rubber elasticity, rubber hardness, and the like.

For example, they are specifically useful for use in shoe soles, sandals, and various parts of footwear, and may also be used in various tires, automobile parts, OA equipment and stationeries, casters, household electrical appliances, medical uses, sports goods, toys, furniture, and the like.

Now, the present invention will be explained with reference to examples, but it should be noted that the scope of the present invention is not limited to these examples in any way.

[Preparation of the Raw Material Rubbery Polymer]

A rubbery polymer which is to be a raw material of the rubber composition used in the Examples and Comparative Examples below was prepared in a batch polymerization using a 10 L autoclave equipped with a stirrer that had been replaced with nitrogen according to the polymerization procedure in the following Table 1.

The total amount of monomer was set at 1.00 kg, which was subjected to copolymerization with a styrene monomer and 1,3-butadiene using n-butyl lithium as a polymerization initiator in a cyclohexane solvent (550 phm) to yield styrene butadiene rubbers SBR-A to –F.

As a vinylation agent tetrahydrofuran was used except for SBR-E, and the amount of vinyl bound in butadiene was controlled.

For SBR-E ((4) in Table 1), potassium-tert-butyl alcholate was used at a ratio of 1/30 moles relative to n-butyl lithium.

In each polymerization batch, the conversion rate (measured by gas chromatography) two minutes after reaching the maximum polymerization temperature was 99.5% or more for styrene, and 99.8% or more for 1,3-butadiene. Thereafter, for SBR-A, tin tetrachloride was added at an amount described in (1) of Table 1, and for SRB-C, tetra glycydyl-1,3-bisaminomethyl cyclohexane was added to a portion of SRB-B at an amount described in (2) of Table 1, and for SBR-D, 1,3-dimethyl imidazolydinone was added at an amount described in (3) of Table 1 and was subjected to coupling or denaturation reaction.

For SRB-F, 24 phr among 1,3-butadienes described in Table 1 according to the random styrene-butadiene production method described in JP-A-59–140211 was added to the polymerization system continuously for 6 minutes from midway of polymerization to the maximum polymerization temperature for randomization.

TABLE 1

|  | SBR-A | SBR-B | SBR-C | SBR-D | SBR-E | SBR-F |
|---|---|---|---|---|---|---|
| Styrene monomre (parts by weight) | 25 | 43 | 43 | 45 | 64 | 56 |
| 1,3-butadiene (parts by weight) | 75 | 57 | 57 | 55 | 36 | 44 |

TABLE 1-continued

|  | SBR-A | SBR-B | SBR-C | SBR-D | SBR-E | SBR-F |
|---|---|---|---|---|---|---|
| n-butyl lithium (phm) | 0.076 | 0.084 | 0.084 | 0.081 | 0.90 | 0.068 |
| Tetrahydrofuran (phm) | 1.1 | 2.4 | 2.4 | 2.3 | (4) | 2.6 |
| Polymerization starting temperature (° C.) | 62 | 63 | 63 | 59 | 67 | 66 |
| Maximum polymerization temperature (° C.) | 90 | 105 | 105 | 92 | 89 | 95 |
| Coupling agent, modifying agent (Li equivalents) | (1) 0.80 | None | (2) 1.20 | (3) 1.00 | None | None |

After the completion of reaction in each run, a 10-fold molar amount of water relative to n-butyl lithium was added to stop the reaction, and as a stabilizer 2,6-di-tert-butyl-4-methylphenol was added to the rubber solution at an amount of 0.3 part by weight per 100 parts by weight of the rubber, and the solvent was evaporated and dried by a drum drier, and finished.

The following Table 2 shows the amount of styrene bound in the produced styrene-butadiene rubber, the amount of styrene block, the amount of vinyl bound in the bound butadiene, and Mooney viscosity.

The amount of styrene bound was determined using a UV spectrophotometer (manufactured by JASCO Corporation, V-520 UV) by comparing with the UV absorption intensity of the standard polystyrene.

The amount of styrene block was determined by dissolving two parts by weight of the copolymer in 100 parts by weight of chloroform, to which five parts by weight of tertiary-butyl hydroperoxide and 0.01 part by weight of osmium tetraoxide were added, which was then decomposed under stirring in a 80° C. water bath for 15 minutes, and to the decomposed solution 10 volumes of methanol was added to filter the resulting precipitate (filter mesh size: 0.45 μm), which was dried and from which weight the amount of styrene block in the polymer was measured.

The amount of 1,2-vinyl bound in butadiene was determined using an IR spectrophotometer (manufactured by JASCO Corporation, V-520 UV) according to the Hampton technique.

TABLE 2

|  | Amount of styrene bound (% by weight) | Amount of styrene block (% by weight) | Amount of vinyl bound (% by weight) | Mooney viscosity (ML1 + 4 100° C.) | Acetone extract (% by weight) |
|---|---|---|---|---|---|
| SBR-A | 25 | 8 | 19 | 57 | 0.7 |
| SBR-B | 43 | 15 | 28 | 43 | 1.0 |
| SBR-C | 43 | 15 | 28 | 61 | 0.9 |
| SBR-D | 45 | 14 | 34 | 48 | 0.8 |
| SBR-E | 64 | 9 | 13 | 71* | 1.2 |
| SBR-F | 56 | 1 | 35 | 36 | 0.9 |

*Mooney viscosity of SBR-E was measured under the condition of ML5 + 4 100° C.

The acetone extract was measured by placing a rubber sample sheet with a thickness of 0.5 mm to a 200 mesh metal net sack, drying the sheet under vacuum after extraction under acetone reflux and measuring it from the difference in weight before and after the procedure.

As other rubbers, the following rubbers were used.

SBR-G is JSR0202, and the acetone extract 4.1% (manufactured by JSR Corporation, the amount of styrene bound: 46% by weight, emulsion polymerization SBR with Mooney viscosity ML1+4 100° C. being 45).

BR-A is D35R (manufactured by Asahi Kasei Corporation, low-cis BR with Mooney viscosity ML1+4 100° C. being 35).

BR-B is UBEPOL-150 (manufactured by Ube Industries, Ltd., cis 1,4-bond 98% by weight, BR with Mooney viscosity ML1+4 100° C. being 43).

[Measurement of Refractive Index of Various Rubbery Polymers]

A refractometer manufactured by ATAGO CO., LTD. was used and the index was measured at 23° C. according to the JIS-K7105.

The result of measurement was:
SBR-A: 1.538
SBR-B: 1.553
SBR-C: 1.553
SBR-D: 1.555
SBR-E: 1.574
SBR-F: 1.565
SBR-G: 1.557
BR-A: 1.519
BR-B: 1.523

For blending and kneading, a 6-inch open roll that permits temperature control and a 0.3 L kneader were used.

[Method of Crosslinking Rubber Compositions and of Determining Physical Properties of Vulcanized Products]

In the Examples and Comparative Examples below, the following equipment and conditions were used for determination of physical properties of each rubber composition.

<Measurement of Dispersibility of Inorganic Fillers>

Scanning probe microscope (SPM) manufactured by Seiko Instruments Inc., Model: SPI3800N Measurement condition: room temperature (23° C.)

Cyclic contact mode, phase image

An image of 5 μm square was enlarged to 20,000 fold, in which circles corresponding to diameters of 0.5 μm, 0.3 μm and 0.2 μm were drawn in regions having no inorganic fillers, and the numbers thereof were counted.

<Measurement of Transparency>

Using a haze meter, type NDH-1001DP manufactured by Nippon Denshoku Industries, Co., Ltd., was used to measure the haze and PT (parallel transmission) of sheet samples having a thickness of 5 mm of rubber compositions obtained in each of Examples and Comparative Examples.

<Measurement of Compression-Set (C-Set) Resistance>

It was measured according to JIS K6301 under the condition of 70° C., 22 hours.

<Measurement of Abrasion Resistance>

Using an Akron abrasion machine, abrasion loss with a load of 6 pounds and 3000 rpm was measured.

<Measurement of the Hardness of Vulcanized Rubber>

It was measured using a Shore A hardness meter (23° C.).

<Others>

For representative Examples, pull tests at 23° C. and measurement of Rupke impact resilience at 23° C. were conducted according to JIS-K6301.

EXAMPLE 1

As the raw material rubber, 70 g of SBR-B and 130 g of BR-B were wrapped and mixed by a mixing roll at 35° C., and 70 g of silica-1 (Reorosil QS20, manufactured by Tokuyama Corporation specific surface area 220 m²/g), 2 g of an age resistor (NOCRAC SP) and 4 g of a silane coupling agent (Vinyl trimethoxysilane) were added and kneaded at the same roll temperature over about 5 minutes. Then, 1.0 g of dicumyl peroxide was added thereto at the same roll temperature (rubber temperature 46° C.), and kneaded again for 2 minutes to prepare a rubber composition.

COMPARATIVE EXAMPLE 1

As the raw material rubber, 70 g of SBR-B and 130 g of BR-B were wrapped and mixed by a mixing roll at 100° C., and 70 g of silica-1 (Reorosil QS20), 2 g of an age resistor (Nocrac SP) and 4 g of a silane coupling agent (Vinyl trimethoxysilane) were added and kneaded at the same roll temperature over about 5 minutes (rubber temperature 103° C.). Then, 1.0 g of dicumyl peroxide was added thereto at the same roll temperature, and kneaded again for 1 minute to prepare a rubber composition.

EXAMPLE 2

As the raw material rubber, 70 g of SBR-A and 130 g of BR-B were wrapped and mixed by a mixing roll at 100° C., and 60 g of silica-1 (Reorosil QS20), 2 g of an age resistor (NOCRAC SP) and 4 g of a silane coupling agent (Vinyl trimethoxysilane) were added and kneaded at the same roll temperature over about 5 minutes (rubber temperature 104° C.). After cooling to room temperature, 1.0 g of dicumyl peroxide was added thereto at a roll temperature of 30° C., and kneaded again for 2 minutes (rubber temperature 43° C.) to prepare a rubber composition.

EXAMPLE 3

As the raw material rubber, 80 g of SBR-G and 120 g of BR-B were wrapped and mixed by a mixing roll at 35° C., and 70 g of silica-1 (Reorosil QS20), 2 g of an age resistor (NOCRAC SP) and 4 g of a silane coupling agent (Vinyl trimethoxysilane) were added and kneaded at the same roll temperature over about 5 minutes (rubber temperature 49° C.). Then, 1.0 g of dicumyl peroxide was added thereto at the same roll temperature, and kneaded again for 3 minutes to prepare a rubber composition.

EXAMPLE 4

As the raw material rubber, 70 g of SBR-C and 130 g of BR-B were wrapped and mixed by a mixing roll at 35° C., and 80 g of silica-1 (Reorosil QS20), 2 g of an age resistor (NOCRAC SP) and 4 g of a silane coupling agent (Vinyl trimethoxysilane) were added and kneaded at the same roll temperature over about 5 minutes (rubber temperature 43° C.). Then, 1.0 g of dicumyl peroxide was added thereto, and kneaded again for 2 minutes to prepare a rubber composition.

EXAMPLE 5

As the raw material rubber, 60 g of SBR-F and 140 g of BR-A were wrapped and mixed by a mixing roll at 40° C., and 70 g of silica-1 (Reorosil QS20), 2 g of an age resistor (NOCRAC SP) and 4 g of a silane coupling agent (Vinyl trimethoxysilane) were added and kneaded at the same roll temperature over about 7 minutes (rubber temperature 49° C.). Then, 1.0 g of dicumyl peroxide was added thereto, and kneaded again for 2 minutes to prepare a rubber composition.

EXAMPLE 6

As the raw material rubber, 150 g of SBR-B and 15 g of silica-2 (Nipsil VN3 previously dried for 2 hours in a 120° C. oven), 1.5 g of an age resistor (NOCRAC SP) and 3 g of a silane coupling agent (Vinyl trimethoxysilane) were added in a 0.3 L kneader, and kneading was started at a cylinder indication temperature of 30° C. Thirty seconds later the temperature reached 37° C. and 15 g of silica-2 was further added and kneading was continued. 15 g of the rest of silica-2 was added thereto at an indication temperature of 47° C. (2 minutes after the start). Seven minutes later, the rubber blend was removed at an indication temperature of 118° C. 30 g of the rubber blend discharged from the kneader was molded by press molding into a sheet 5 mm thick, and the haze thereof was measured. The haze was 43%. Then, 0.64 g of dicumyl peroxide was added thereto at a 50° C. roll, and kneaded for 2 minutes to prepare a rubber composition.

COMPARATIVE EXAMPLE 2

As the raw material rubber, 150 g of SBR-B and 15 g of silica-1 (Reorosil QS20), 1.5 g of an age resistor (NOCRAC SP) and 3 g of a silane coupling agent (Vinyl trimethoxysilane) were added in a 0.3 L kneader, and kneading was started at a cylinder indication temperature of 75° C. Thirty seconds later the indication temperature reached 91° C., and 15 g of silica-1 was added thereto and kneading was continued, and at an indication temperature of 105° C. (2 minutes after the start) the rest of 15 g of silica-1 was added. 5 minutes and 30 seconds later, the indication temperature reached 129° C. and the rubber blend was removed. 30 g of the rubber blend discharged from the kneader was molded by press molding into a sheet 5 mm thick, and the haze thereof was measured. The haze was 75%. Then, 0.64 g of dicumyl peroxide was added thereto at a 80° C. roll, and kneaded to prepare a rubber composition.

EXAMPLE 7

As the raw material rubber, 15 g of SBR-A, 45 g of SBR-D, 90 g of BR-B, 20 g of silica-1 (Reorosil QS20), 1.5 g of an age resistor (NOCRAC SP) and 3 g of a silane coupling agent (Vinyl trimethoxysilane) were added in a 0.3 L kneader, and kneading was started at a cylinder indication temperature of 33° C. 20 g of silica-1 (Reorosil QS20) was added thereto at an indication temperature of 38° C. Kneading was further continued, and at 1 minute 20 seconds, the indication temperature reached 50° C. and the rest of 20 g of silica-1 (Reorosil QS20) was added. Kneading was continued, and five minutes later the rubber blend was removed at an indication temperature of 121° C. Then, 0.64 g of dicumyl peroxide was added thereto at a 50° C. roll, and kneaded to prepare a rubber composition.

COMPARATIVE EXAMPLE 3

As the raw material rubber, 60 g of SBR-B and 140 g of BR-B were wrapped and mixed by a mixing roll at 35° C., and 6 g of silica-1 (Reorosil QS20), 2 g of an age resistor (NOCRAC SP) and 4 g of a silane coupling agent (Vinyl trimethoxysilane) were added and kneaded at the same roll temperature over about five minutes (rubber temperature 43° C.). Then, 1.0 g of dicumyl peroxide was added thereto at the same roll temperature, and kneaded again for 1 minute to prepare a rubber composition.

The composition of the rubber compositions prepared in Examples 1–7 are summarized in the following Table 3, and the composition of the rubber compositions prepared in Comparative Examples 1–3 are summarized in the following Table 4.

TABLE 3

(Unit: parts by weight)

| | Ex. 1 | Ex. 2 | Ex. 3 | Ex. 4 | Ex. 5 | Ex. 6 | Ex. 7 |
|---|---|---|---|---|---|---|---|
| SBR-A | | 35 | | | | | 10 |
| SBR-B | 35 | | | | 100 | | |
| SBR-C | | | 35 | | | | |
| SBR-D | | | | | | | 30 |
| SBR-F | | | | 30 | | | |
| SBR-G | | | 40 | | | | |
| BR-A | | | | | 70 | | |
| BR-B | 65 | 65 | 60 | 65 | | 60 | |
| Silica-1 | 35 | 30 | 35 | 40 | 35 | | 40 |
| Silica-2 | | | | | | 30 | |
| vinyl trimethoxysilane | 2 | 2 | 2 | 2 | 2 | 2 | 2 |
| NOCRAC SP | 1 | 1 | 1 | 1 | 1 | 1 | 1 |
| Dicumyl peroxide | 0.5 | 0.5 | 0.5 | 0.5 | 0.5 | 0.43 | 0.43 |

In the table, silica-1 was Reorosil QS20 manufactured by Tokuyama Corporation and silica-2 was Nipsil VN3 manufactured by Nippon Silica Industries., Co. NOCRAC SP was manufactured by Ouchi Shinko Chemical Industrial Co., Ltd.

TABLE 4

(Unit: parts by weight)

| | Com. Ex. 1 | Com. Ex. 2 | Com. Ex. 3 |
|---|---|---|---|
| SBR-A | | | |
| SBR-B | 35 | 100 | 30 |
| SBR-C | | | |
| SBR-D | | | |
| SBR-F | | | |
| SBR-G | | | |
| BR-A | | | |
| BR-B | 65 | | 70 |
| Silica-1 | 35 | | 3 |
| Silica-2 | | 30 | |
| vinyl trimethoxysilane | 2 | 2 | 2 |
| NOCRAC SP | 1 | 1 | 1 |
| Dicumyl peroxide | 0.5 | 0.43 | 0.5 |

In the table, silica-1 was Reorosil QS20 manufactured by Tokuyama Corporation and silica-2 was Nipsil VN3 manufactured by Nippon Silica Industries., Co. NOCRAC SP was manufactured by Ouchi Shinko Chemical Industrial Co., Ltd.

The rubber compositions obtained in the above Examples 1–7 and Comparative Examples 1–3 were press vulcanized at 160° C. for 10 minutes (15 MPa pressure), and after allowing to stand all day and night to cool, physical properties such as the transparency, Akron abrasion and c-set etc. of the vulcanized rubber compositions were measured. The results on Examples are shown in Table 5, and those on Comparative Examples are shown in Table 6.

TABLE 5

| | Ex. 1 | Ex. 2 | Ex. 3 | Ex. 4 | Ex. 5 | Ex. 6 | Ex. 7 |
|---|---|---|---|---|---|---|---|
| *The number of regions having no inorganic fillers | | | | | | | |
| Region diameter of 0.5 μm or greater | 0 | 0 | 0 | 0 | 0 | 0 | 0 |
| Region diameter of 0.3 μm or greater | 0 | 2 | 0 | 0 | 0 | 1 | 0 |
| Region diameter of 0.2 μm or greater | 0 | 3 | 1 | 0 | 2 | 4 | 0 |
| Haze (%) | 19 | 43 | 45 | 17 | 29 | 39 | 26 |
| Parallel transmission (%) | 63 | 34 | 31 | 65 | 54 | 43 | 58 |
| c-set(%) | 20 | 19 | 27 | 15 | 21 | 22 | 17 |
| Akron abrasion CC/3000 times | 0.026 | 0.025 | 0.026 | 0.018 | 0.029 | 0.034 | 0.021 |

*The number of regions having no inorganic fillers are the number of regions with a diameter of 0.5 μm or greater, the number of regions with a diameter of 0.3 μm or greater, and the number of regions with a diameter of 0.2 μm or greater in the SPM image.

TABLE 6

|  | Com. Ex. 1 | Com. Ex. 2 | Com. Ex. 3 |
| --- | --- | --- | --- |
| *The number of regions having no inorganic fillers | | | |
| Region diameter of 0.5 μm or greater | 0 | 0 | 1 |
| Region diameter of 0.3 μm or greater | 6 | 5 | 2 |
| Region diameter 0.2 μm or greater | 11 | 9 | 18 |
| Haze (%) | 77 | 73 | 72 |
| Parallel transmission (%) | 19 | 15 | 16 |
| c-set (%) | 25 | 27 | 22 |
| Akron abrasion CC/3000 times | 0.046 | 0.053 | 0.114 |

*The number of regions having no inorganic fillers are the number of regions with a diameter of 0.5 μm or greater, the number of regions with a diameter of 0.3 μm or greater, and the number of regions with a diameter of 0.2 μm or greater in the SPM image.

Figure 1:
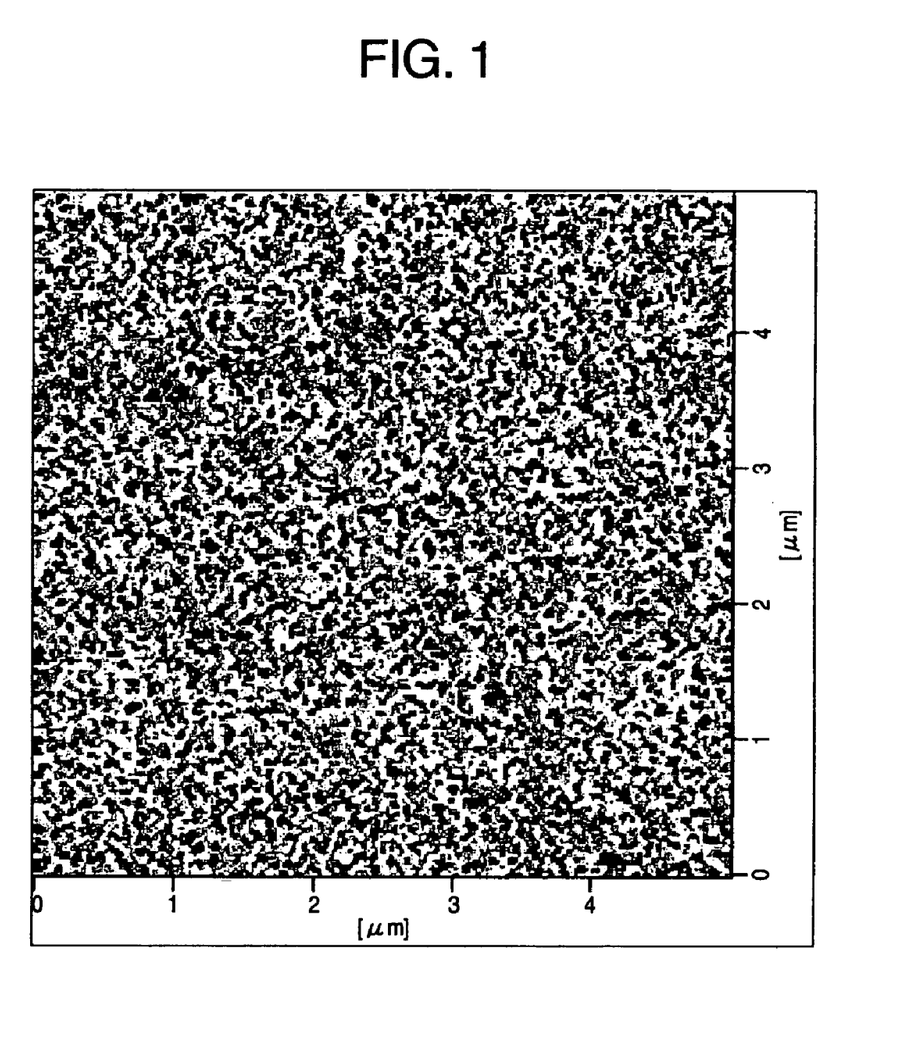
FIG. 1 is a photograph of an image of a 5 µm square of the rubber composition in Example 1 determined by a SPM.
Figure 2:
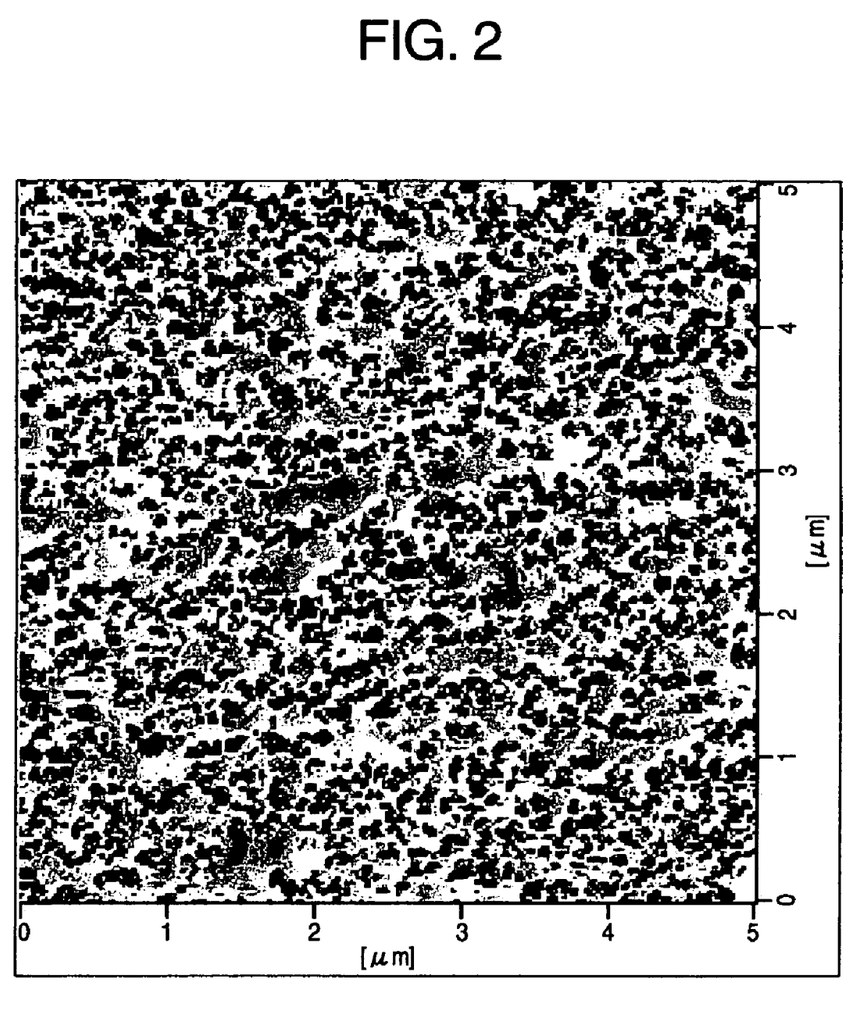
FIG. 2 is a photograph of an image of a 5 µm square of the rubber composition in Comparative Example 1 determined by a SPM. In these photographs, hard silica particles are indicated in black. In the rubber composition of Example 1, silica is uniformly dispersed, and there are no regions with a diameter of 0.3 µm or more having no inorganic fillers. In the rubber composition of Comparative Example 1, silica is not uniformly dispersed, and there can be seen many regions having no inorganic fillers.

With regard to silica dispersibility by the confirmation of the SPM image, there were very few circular regions having no silica with a diameter of 0.3 μm or greater in the rubber compositions of Examples 1–7. In contrast, there were many regions having no silica with a diameter of 0.3 μm or greater in the rubber compositions of Comparative Examples 1–3, and the haze was high and transparency was poor.

In Example 1, the rubber temperature at kneading was 60° C. or lower, and the abrasion resistance and c-set of the crosslinked product were good and had a remarkably excellent transparency as compared to Comparative Example 1 in which kneading was carried out at a roll temperature of 100° C. The hardness of the crosslinked product of Example 1 had sufficient rubber characteristics with a Shore A of 64, a 300% modulus of 10.6 Mp, a tensile strength of 19.2 Mp, an extension of 510%, a tear strength of 41 N/mm, and a Rupke impact resilience of 52 at a room temperature (23° C.).

In Example 2 in which the first step was a high temperature kneading at 100° C. and at the second step kneading was carried out at a low temperature, transparency and balance of physical properties were more excellent than that of Comparative Example 1.

Example 3 exhibited a little coloring at yellow, and the haze was not greater than 50%.

Example 4 was an example of a modified styrene-butadiene rubber, which had an excellent transparency and good balance with c-set.

In Example 6, a wet type silica was dried prior to use in the blending by a kneader. At a temperature of 60° C. or less, a styrene-butadiene rubber and silica were kneaded for 2 minutes or more, and then the temperature started to rise resulting in a high-temperature kneading, but by kneading again at 50° C., transparency and balance of physical properties were more excellent than that of Comparative Example 1 or Comparative Example 2.

In Example 7, two types of styrene-butadiene rubbers were used, but transparency and balance of physical properties were excellent.

In Comparative Example 3, the amount of silica was too little and transparency was poor, and there was very little reinforcing effect of the filler leading to poor abrasion resistance.

EXAMPLE 8

As the raw material rubber, 70 g of SBR-B and 130 g of BR-B were wrapped and mixed by a mixing roll at 65° C., and 140 g of silica-1 (Reorosil QS20), 2 g of an age resistor (NOCRAC SP) and 4 g of a silane coupling agent (Vinyl trimethoxysilane) were added and kneaded at the same roll temperature over about 12 minutes, and after cooling at room temperature, 1.0 g of dicumyl peroxide was added thereto at a roll temperature of 30° C., and kneaded again for 2 minutes to prepare a rubber composition.

EXAMPLE 9

As the raw material rubber, a given amount described in Table 3 of the raw material rubber that was prepared by mixing 40 g of SBR-B and 40 g of SBR-E in a mixing roll at 80° C., and then after cooling at room temperature, premixed at a mixing roll temperature of 35° C., 120 g of BR-B and 80 g of silica-1 (Reorosil QS20), 2 g of an age resistor (NOCRAC SP) and 4 g of a silane coupling agent (Vinyl trimethoxysilane) were added and kneaded for 6 minutes, and then under the same temperature condition (rubber temperature 43° C.), 1.0 g of dicumyl peroxide was added thereto, and kneaded again for 2 minutes to prepare a rubber composition.

EXAMPLE 10

At a mixing roll temperature of 70° C., 20 g of SBR-D, 40 g of SBR-E, 140 g of BR-B, 100 g of silica-1 (Reorosil QS20), 2 g of an age resistor (NOCRAC SP) and 4 g of a silane coupling agent (Vinyl trimethoxysilane) were added and kneaded for 7 minutes, and after cooling at room temperature, 1.0 g of dicumyl peroxide was added thereto at a mixing roll temperature of 35° C. (rubber temperature 43° C.), and kneaded again for 5 minutes to prepare a rubber composition.

COMPARATIVE EXAMPLE 4

At a mixing roll temperature of 70° C., 20 g of SBR-B, 40 g of SBR-E, 140 g of BR-B, 100 g of silica-1 (Reorosil QS20), 2 g of an age resistor (NOCRAC SP) and 4 g of a silane coupling agent (Vinyl trimethoxysilane) were added and kneaded for 7 minutes, and then 1.0 g of dicumyl peroxide was added and kneaded for 2 minutes to prepare a rubber composition.

The composition of the rubber compositions prepared in Examples 8–10 and Comparative Example 4 are summarized in Table 7.

TABLE 7

| | | | | (Unit: parts by weight) |
| --- | --- | --- | --- | --- |
| | Ex. 8 | Ex. 9 | Ex. 10 | Com. Ex. 4 |
| SBR-A | | | | |
| SBR-B | 35 | 20 | | 10 |
| SBR-C | | | | |
| SBR-D | | | 10 | |
| SBR-E | | 20 | 20 | 20 |
| BR-B | 65 | 60 | 70 | 70 |
| Silica-1 | 70 | 40 | 50 | 50 |
| Vinyl trimethoxysilane | 2 | 2 | 2 | 2 |
| NOCRAC SP | 1 | 1 | 1 | 1 |
| Dicumyl peroxide | 0.5 | 0.5 | 0.5 | 0.5 |

In the table, silica-1 was Reorosil QS20 manufactured by Tokuyama Corporation and NOCRAC SP was manufactured by Ouchi Shinko Chemical Industrial Co., Ltd.

The rubber compositions obtained in the above Examples 8, 9, and 10 and Comparative Example 4 were press vulcanized at 160° C. for 10 minutes (15 MPa pressure), and after allowing to stand all day and night to cool in a thermostatic chamber, the transparency and hardness of the vulcanized rubber compositions were measured. The results are shown in Table 8.

TABLE 8

|  | Ex. 8 | Ex. 9 | Ex. 10 | Com. Ex. 4 |
|---|---|---|---|---|
| *The number of regions having no inorganic fillers |  |  |  |  |
| Region diameter of 0.5 µm or greater | 0 | 0 | 0 | 1 |
| Region diameter of 0.3 µm or greater | 0 | 0 | 0 | 4 |
| Region diameter of 0.2 µm or greater | 0 | 0 | 2 | 8 |
| Haze (%) | 17 | 28 | 26 | 86 |
| Parallel transmission (%) | 64 | 58 | 59 | 11 |
| Hardness Shore A | 96 | 93 | 92 | 93 |

*The number of regions having no inorganic fillers are the number of regions with a diameter of 0.5 µm or greater, the number of regions with a diameter of 0.3 µm or greater, and the number of regions with a diameter of 0.2 µm or greater in the SPM image.

By increasing the amount of silica in Example 8 and adding a styrene-butadiene copolymer having a great amount of styrene bound in Example 9 and 10, rubber compositions having a high hardness and an excellent transparency were obtained. The rubber composition of Comparative Example 4 has a high hardness, but the haze is high and transparency is poor.

INDUSTRIAL APPLICABILITY

Since the rubber compositions of the present invention have an excellent balance of transparency and physical properties such as c-set, and have an excellent transparency even when converted to highly hard products, they can be used in various applications that require these physical properties of rubber in addition to transparency and beautiful coloring, and are specifically useful in applications for footwear.

The invention claimed is:

1. A rubber composition comprising 100 parts by weight of a rubbery polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 µm or more having no inorganic fillers is one or less and the number of circular regions with a diameter of 0.3 µm or more having no inorganic fillers is three or less in an image of a 5 µm square of said rubber composition determined by a scanning probe microscope (SPM), and wherein said rubbery polymer comprises 5–80% by weight of a rubbery polymer component (A) having a refractive index of 1.535 or greater and less than 1.600 and 20–95% by weight of a rubbery polymer component (B) having a refractive index of 1.400 or greater and less than 1.530.

2. The rubber composition according to claim 1 wherein the difference in refractive index between component (A) and component (B) is 0.010 or greater.

3. The rubber composition according to claim 1 or 2 wherein component (A) is a copolymer of a vinyl aromatic compound and a conjugated diene compound in which the amount of the vinyl aromatic compound bound is 26–90% by weight, and component (B) is a diene polymer in which the amount of the vinyl aromatic compound bound is 25% by weight or less, and the haze of said rubber composition having a thickness of 5 mm is 37% or less.

4. The rubber composition according to claim 3 wherein the amount of the vinyl aromatic compound bound in the copolymer of component (A) is greater than that in the polymer of component (B) by 25% by weight or more.

5. The rubber composition according to claim 3 wherein acetone extract in each of component (A) and component (B) is 2% by weight or less.

6. The rubber composition according to claim 3 wherein the component (B) is a polybutadiene in which the amount of 1,4-cis bond is 80% by weight or more.

7. The rubber composition according to claim 1 or 2 wherein the inorganic filler is a silica filler having a specific surface area of 100 m$^2$/g or more.

8. The rubber composition according to claim 1 or 2 wherein the inorganic filler is a dry silica having a mean primary particle diameter of 30 mm or smaller.

9. A method of producing a rubber composition comprising 100 parts by weight of a rubbery polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 µm or more having no inorganic fillers is one or less and the number of circular regions with a diameter of 0.3 µm or more having no inorganic fillers is three or less in an image of a 5 µm square of said rubber composition determined by a scanning probe microscope (SPM), said method comprising kneading said rubbery polymer and said inorganic filler for at least 30 seconds or longer per run of kneading at a rubber temperature of 0–60° C.

10. A method of producing a rubber composition comprising 100 parts by weight of a rubbery polymer and 5–150 parts by weight of an inorganic filler per 100 parts by weight of said rubbery polymer, wherein the haze of said rubber composition having a thickness of 5 mm is 50% or less, and the inorganic filler is dispersed so that the number of circular regions with a diameter of 0.5 µm or more having no inorganic fillers is one or less and the number of circular regions with a diameter of 0.3 µm or more having no inorganic fillers is three or less in an image of a 5 µm square of said rubber composition determined by a scanning probe microscope (SPM), and wherein the rubber composition comprises 5–80% by weight of a rubbery polymer component (A) having a refractive index of 1.535 or greater and less than 1.600 and 20–95% by weight of a rubbery polymer component (B) having a refractive index of 1.400 or greater and less than 1.530, said method comprising kneading said rubbery polymer and the inorganic filler for at least 30 seconds or longer per run of kneading at a rubber temperature of 10–50° C.

11. A footwear comprising footwear containing the rubber composition according to claim 1 or 2.

* * * * *